United States Patent [19]
Haapala

[11] 4,364,437
[45] Dec. 21, 1982

[54] CULTIVATING TOOL

[76] Inventor: Ray Haapala, Rte. 3, Box 76, Dassel, Minn. 55325

[21] Appl. No.: 336,414

[22] Filed: Dec. 31, 1981

[51] Int. Cl.³ .............................................. A01B 1/10
[52] U.S. Cl. ................................... 172/349; 172/373; 172/375; 172/549; 172/550
[58] Field of Search ............... 172/349, 350, 372, 373, 172/374, 375, 379, 380, 540, 548, 549, 550; 56/400.02, 400.03, 400.19, 400.21; D8/8, 13, 6

[56] References Cited
U.S. PATENT DOCUMENTS

| | | | |
|---|---|---|---|
| 948,820 | 2/1910 | Mosher | 172/548 X |
| 2,048,201 | 7/1936 | Short | 172/350 |
| 3,782,770 | 1/1974 | Lee | 172/378 X |

FOREIGN PATENT DOCUMENTS

| | | | |
|---|---|---|---|
| 727464 | 12/1966 | Italy | 172/540 |
| 27068 | 11/1897 | United Kingdom | 172/540 |

*Primary Examiner*—Richard T. Stouffer
*Assistant Examiner*—William H. Honaker
*Attorney, Agent, or Firm*—Littlepage & Webner

[57] ABSTRACT

A cultivating tool propelled by a walking attendant has sheet metal tines mounted on a rotating axle for rotation therewith. The tines are channel-shaped with axle-accommodating apertures through the flanges and also through the webs. When the axle is engaged through the flange apertures, the ends of the web engage the soil flatwise so as to provide a hoeing action; and when the axle is engaged through the web apertures, the ends of the web engage the soil edgewise so as to provide a chopping action.

5 Claims, 5 Drawing Figures

4,364,437

CULTIVATING TOOL

FIELD OF INVENTION

Hand tool, plural prongs, teeth or serrations made from sheet metal in class 172, subclass 380.

OBJECTS

The primary object of this invention is to provide a soil cultivating tool alternately usable either for chopping into the soil with rotating knife-like tine ends or for hoeing the soil with relatively flat-hoelike tine ends, all depending upon the arrangement of the individual tines on the axle.

In accordance with the above object it is intended to provide tines which are easily and quickly shiftable from one mode, knifing or hoeing, to the other, and which may be set up with some of the tines in knifing mode and others in hoeing mode.

A further object is to provide in a rotating tine cultivating tool, a tine mounting arrangement wherein the tines are loosely mounted on a rotating axle for rotation therewith, and wherein the tines may selectively be disposed at any one of a plurality of angles with respect to one another. By this arrangement, the tines may be disposed to engage the ground in different phase relationships, i.e., one or two tines may momentarily be disposed in ground-engaging position while others are leaving the ground, while others are momentarily free of the ground, the result being that the tool is easy to work with a smooth-nonjumping motion.

Figure 2:
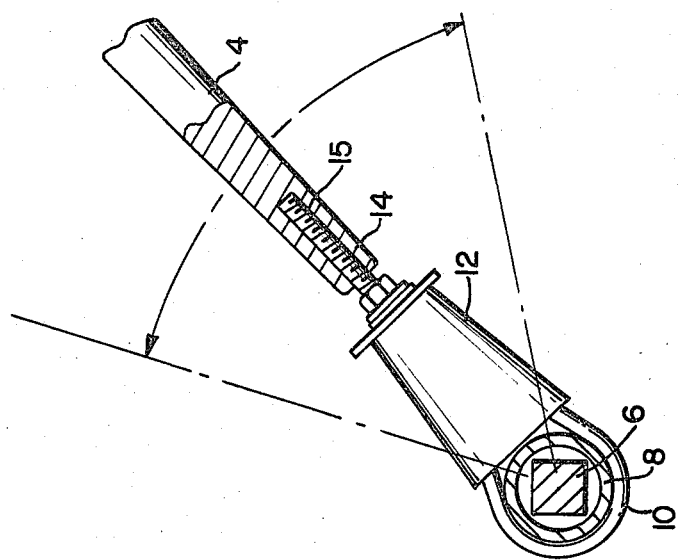
FIG. 2 is a cross-section through the mid-portion of the tool with the tines removed.

Referring now to the drawings, in which like reference numerals denote similar elements, the tool 2 is manually actuated by means of a handle 4 on the end of which is rotatably mounted a rectangular axle 6. A bushing 8 rotatably supports the axle, the bushing being embraced by a U-bolt 10 whose ends are clamped within a collar 12, which is mounted on the ends of the handle by means of a bolt 14 engaging in the thread socket 15 in the end of the handle.

Figure 1:
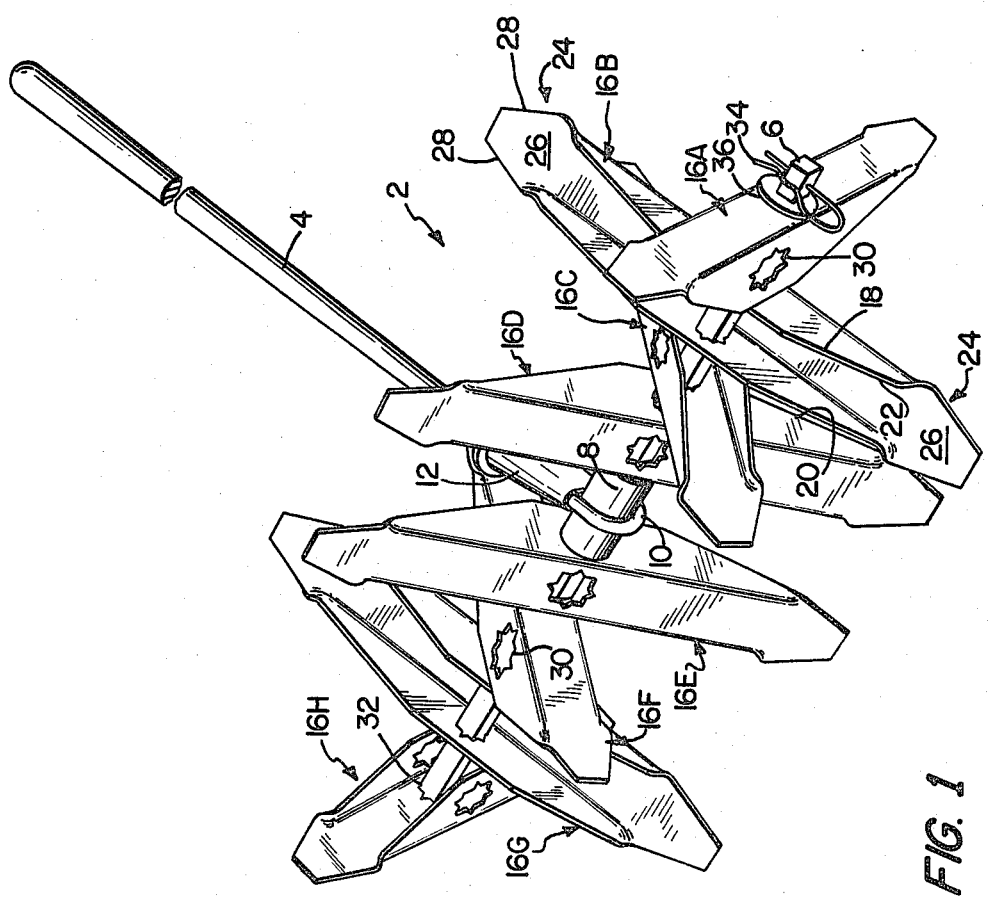
FIG. 1 is a perspective view of the tool with some of the tines arranged in chopping mode and others in hoeing mode.
Figure 3:
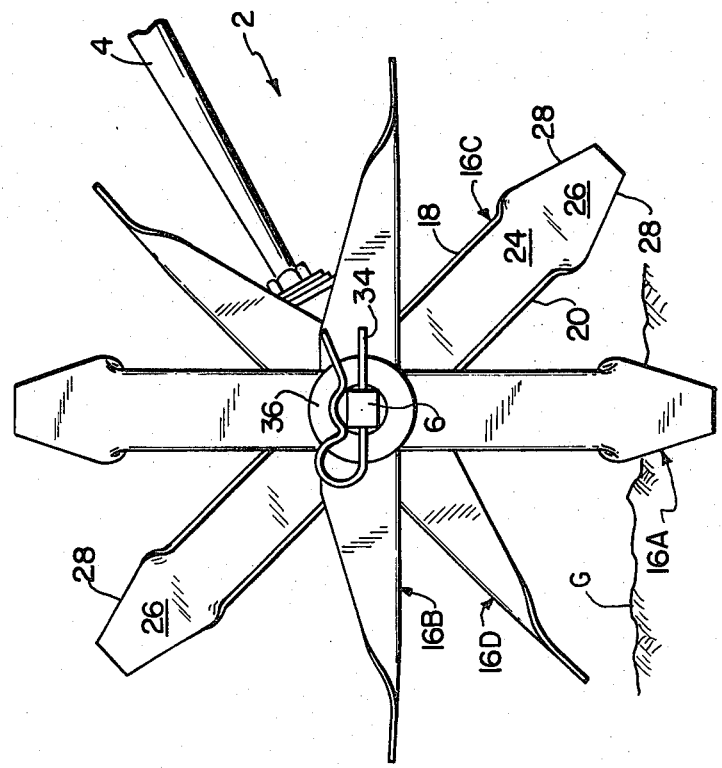
FIG. 3 is an end view of the tool shown in FIG. 1, with the tines rotated from their FIG. 1 position.

Cultivation is accomplished by means of channel-shape tines 16 which are designated in FIG. 1 and FIG. 3 with the suffixes A through H for purposes of describing different modes, hoeing or chopping, in which they may be disposed and the different angular positions in which they may be arranged. Since the tines are identical, only one will be detailed.

Figure 5:
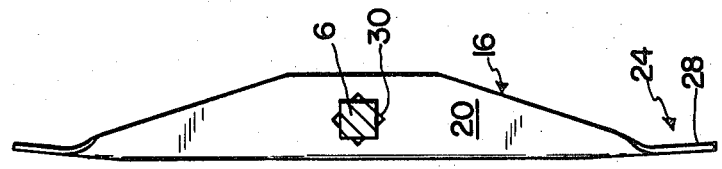
Figure 4:
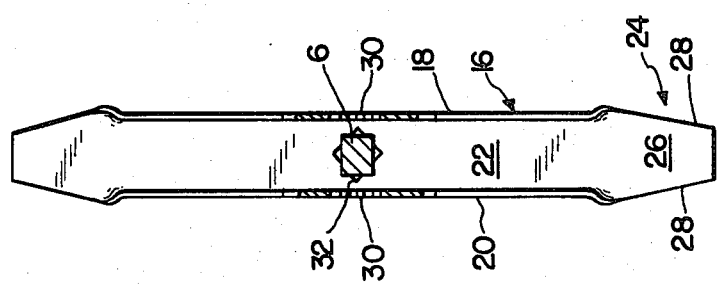
FIG. 4 is a cross-section showong one of the tines disposed in chopping mode; and, FIG. 5 is a cross-section through the tine arranged in hoeing mode.

Each tine 16, being channel-shape, has a pair of flanges 18 and 20 and a web 22. The web has spade-shape ends 24 which extend beyond the flanges with flat sides 26 between thin knife-like edges 28. Each tine has apertures 30 through the flanges and an aperture 32 through the web. It is noteworthy that the apertures 30, 32 are star-shape so as to non-rotatably mount the tines on the square axle 6. It will be apparent by comparing FIG. 4 with FIG. 5 that when a tine is mounted on the axle with the axle engaging through the web aperture 32, the tine is disposed so that the thin knife-like edges 28 chop into the ground, whereas, when the axle engages through the flange apertures 30, the spade-shaped web ends 24 engage the ground flatwise in hoeing mode. The tines are kept from displacement off the ends of the axle by cotter pins 34 which are prevented from binding against the tines by washers 36. Preferably, the axle should engage loosely through the aperture so as to provide a limited amount of play.

FIGS. 1 and 3 illustrate typical arrangements for the tines. Assuming the tool is being pushed forwardly (to the left as seen in FIGS. 1 and 3) by the attendant, in FIG. 1 it will be seen that tines 16A and 16H are disposed in chopping mode and are leaving the ground, tines 16B and 16G are in hoeing mode and about to enter the ground, and tines 16C and 16F are in chopping mode, and are free of the ground. In FIG. 3, tine 16A is in knifing mode and has entered the ground, tine 16B is in hoeing mode and free of the ground; tine 16D is in hoeing mode about to enter the ground; and tine 16C is in chopping mode having left the ground. From the foregoing it will be apparent that the tines may be selectively arranged in various angular positions with respect to one another and they may be also selectively arranged in either hoeing or chopping mode. Furthermore, some or all of the tines may be arranged out of phase from the others, and the loose fit of the star-shaped openings over the rectangular axle provides an easy motion of the tool through the soil such as to militate against binding of the tine ends into a hard or clayey soil or with plant stalks or roots.

I claim:
1. A cultivating tool comprising,
an elongate handle,
an elongate axle on the handle with its longitudinal axis transverse to the length of the handle,
a series of sheet metal tines,
each of the tines being channel-shaped, having flange portions connected by a web portion,
the web portion at each end of the tine extending beyond the channel portion and having a flat surface lengthwise between relatively thin side edges,
and means for mounting the tines at their mid portions on the axle in two different modes comprising apertures through the tine web portion and apertures through the flange portions, said apertures of said tine web portions and of said flange portions being sized to be engageable over said axle whereby, when the apertures through the web portion of one of the tines are engaged over the axle and the tool propelled along the ground, the thin edges of the tine web portion ends are presented knife-like to the ground, and when the apertures through the flange portions of the tines are engaged over the axle, the flat ends of the tine web portions are presented hoe-like to the ground.

2. The combination claimed in claim 1,
said axle being mounted on said handle for rotation about its longitudinal axis,
the means for mounting the tines on the axle providing for rotation of the tines with the axle.

3. The combination claimed in claim 2,
said means comprising a non-round shape of the axle and also a non-round shape of said apertures.

4. The combination claimed in claim 3, wherein the axle engages loosely through the apertures.

5. The combination claimed in claim 3, said axle being substantially square in cross-section and said apertures being substantially star-shaped, whereby the tines may be mounted on the axle at selected ones of various angular positions with respect to one another.

* * * * *